A. T. MINGE.
PLOWSHARE.
APPLICATION FILED JULY 19, 1912.
1,099,897. Patented June 9, 1914.
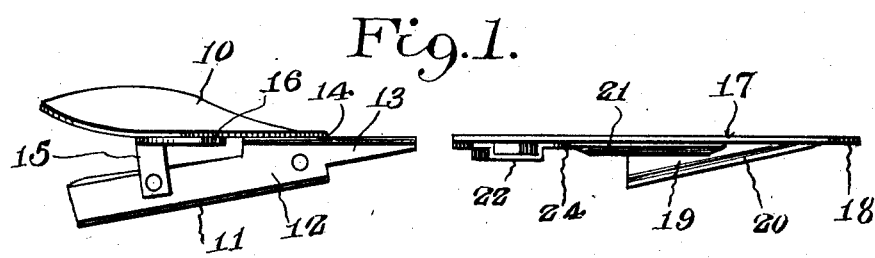
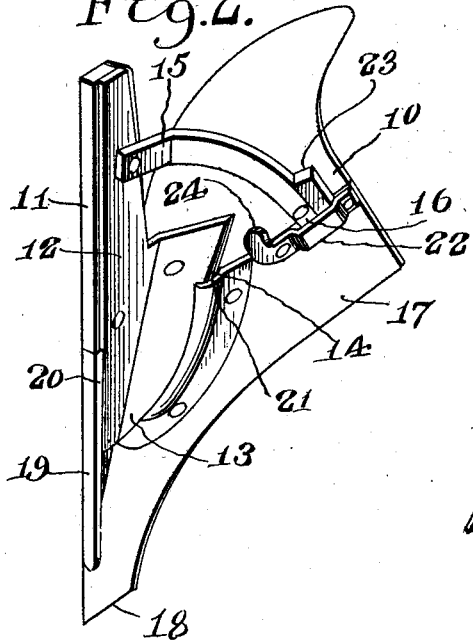
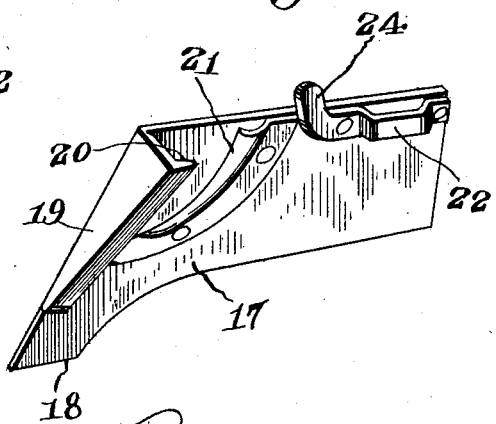
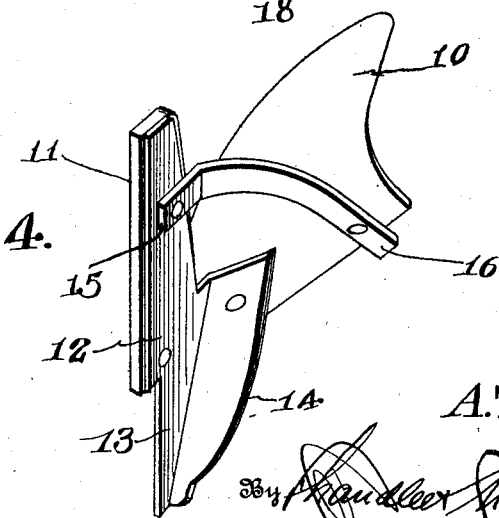
Inventor,
A. T. Minge.

UNITED STATES PATENT OFFICE.

AUGUST T. MINGE, OF BRECKINRIDGE, OKLAHOMA.

PLOWSHARE.

1,099,897. Specification of Letters Patent. Patented June 9, 1914.

Application filed July 19, 1912. Serial No. 710,471.

*To all whom it may concern:*

Be it known that I, AUGUST T. MINGE, a citizen of the United States, residing at Breckinridge, in the county of Garfield, State of Oklahoma, have invented certain new and useful Improvements in Plowshares; and I do hereby declare the following to be a full, clear, and exact description of the invention, such as will enable others skilled in the art to which it appertains to make and use the same.

This invention has special reference to plows and more particularly to plowshares, the primary object of the invention being to provide a plowshare having a simple, novel and durable fastening means by which the same is secured to the mold board and land side of the plow without the use of bolts and so that the share can be readily attached and removed.

With the above and other objects in view, the invention consists of certain other combinations and arrangements of parts as will be hereinafter more fully described, claimed and illustrated in the accompanying drawings, in which:

Figure 1 is an underside view showing the parts of the plow separated and looking toward the edge portions of the mold-board and share constituting a part thereof. Fig. 2 is a perspective rear view with the parts assembled. Fig. 3 is a detail perspective view of the share removed. Fig. 4 is a similar view of the mold-board and land side with the share removed.

As illustrated in the drawings, the numeral 10 designates the mold-board and the numeral 11 the land side which is attached to the mold-board by an angular plate or frog 12 having its forward end reduced in width and tapered as shown at 13 while the free edge of the portion of the frog which is secured to the mold-board is beveled and curved upwardly as shown at 14 for engagement with the plowshare as will be hereinafter described. A brace 15 also connects the rear portions of the land side and mold-board and its free end is tapered and projects beyond the forward edge of the mold-board as shown at 16.

The share is indicated by the numeral 17 and terminates in a point 18 and is formed at its forward edge with a triangular projection 19 having a side flange 20 for receiving the projecting portion of the frog and retaining the same from lateral displacement. The inner face of the share is provided with a curved offset portion or lip 21 which receives the curved edge of the frog and further holds the parts coupled together and permits the same to be slid one into the other.

The rear portion of the inner face of the share near its rear edge is provided with a keeper or bracket 22 which receives the projecting end 16 of the brace 15 which is securely held therein by means of a wedge key 23 so that the parts are securely held from displacement. The forward end of the keeper projects upwardly as shown at 24 immediately in rear of the lip 21 to overlie the mold-board and thus hold the parts of the plow in positive alinement for proper cutting action.

It will thus be seen that I have provided a very efficient and novel form of plow share and securing means for the two parts of the plow which greatly facilitates the attaching and separation thereof for all desired purposes.

I claim:

1. The combination with a plow having its frog portion extended past the mold-board and land side, of a detachable share, a laterally and inwardly bent extension embracing the extended portion of the frog, a lateral extension at one side of the frog, an angular flange on the share for receiving the extension of the frog last-mentioned, an extension carried by the mold board, a bracket for receiving the extension and means for locking the extension in the bracket.

2. The combination with a mold-board, a landside and an angular plate secured thereto and provided with a reduced pointed forward end, the portion secured to the mold-board having a curved edge; of a brace between the mold-board and landside, a plowshare having a lateral triangular projection provided with a flange receiving and holding the aforesaid forward end of the angular plate, an offset carried by the share for receiving the curved edge portion of the angle plate, a keeper also carried by the lay and having an extension engaging the mold-board to hold the parts in alinement, said brace engaging the keeper and a wedge key engaged between the keeper and brace to lock the parts together.

In testimony whereof, I affix my signature, in presence of two witnesses.

AUGUST T. MINGE.

Witnesses:
C. W. BURTON,
R. H. NERENBERG.